(No Model.)
H. G. STIEBEL, Jr.
WEIGHING SCOOP.
No. 541,891. Patented July 2, 1895.
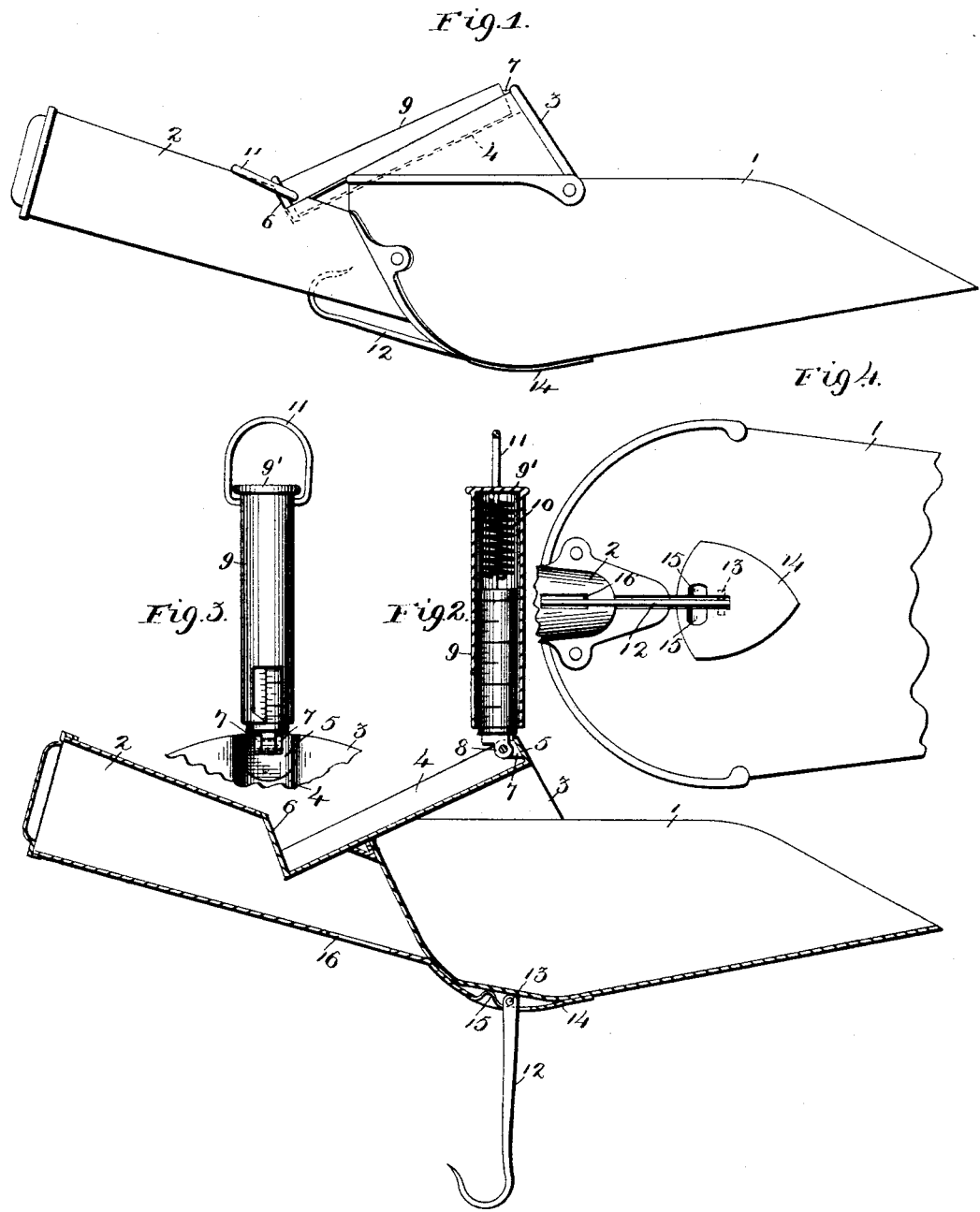

UNITED STATES PATENT OFFICE.

HENRY G. STIEBEL, JR., OF ST. LOUIS, MISSOURI.

WEIGHING-SCOOP.

SPECIFICATION forming part of Letters Patent No. 541,891, dated July 2, 1895.

Application filed November 12, 1894. Serial No. 528,483. (No model.)

*To all whom it may concern:*

Be it known that I, HENRY G. STIEBEL, Jr., of the city of St. Louis, State of Missouri, have invented certain new and useful Improvements in Weighing-Scoops, of which the following is a full, clear, and exact description, reference being had to the accompanying drawings, forming a part hereof.

My invention has relation to improvements in scoops and consists in the novel arrangement and combination of parts more fully set forth in the specification and pointed out in the claims.

In the drawings, Figure 1 is a perspective view of my invention. Fig. 2 is a middle vertical longitudinal section with the spring scale and hook in the weighing position. Fig. 3 is an end view of the spring scale; and Fig. 4 is a bottom view of the medium portion of the scoop.

The object of my invention is to combine a scoop with a suitable weighing scale, and with a hook for suspending articles that are too large to be placed into the scoop.

A further object is to so combine the parts that the scale and hook or either of them can be folded out of the way of the operator when the scoop is to be used for its customary purposes.

In detail the device can be described as follows:

Referring to the drawings, 1 represents the body portion of the scoop of usual construction, and 2 the handle thereof.

3 represents the upper convex wall of the scoop. Along the medial line of said wall 3 and in continuation of the general direction of the handle is disposed a groove 4 the outer end of the groove being limited by a wall 5, and the inner end by the abutting wall 6, the latter being formed in the path of the handle 2 into which the groove 4 partially enters. The plane of the wall 6 is slightly inclined to the axis of the groove, as shown in Fig. 2, that is, it makes an angle a little less than a right angle for a purpose to be subsequently referred to. From the inner face of the wall 5 there project ears 7 between which is pivoted by means of a lug 8, a weighing scale 9 of ordinary construction. The terminal wall 9' of the casing of the scale is adapted, when the scale is folded into the groove 4, to lock firmly against the inclined wall 6, the spring 10 of the scale serving to keep the parts in their locked position, and at the same time preserve the tension of the spring when the scale is not being used for weighing purposes. When thus normally resting in the groove 4 the casing of the scale occupies the position as shown in Fig. 1. It can be withdrawn from this position by the pivoted ring 11 at the end of the casing.

In Fig. 2 the scale is shown as occupying a weighing position, for weighing either the contents of the scoop, or an article suspended from the hook 12 which is pivoted or suspended from a pin 13 interposed between the bottom of the scoop and an extra plate 14 soldered along its edges to said bottom. The plate 14 is, at a suitable point 15 pressed against the the bottom of the scoop to prevent the pin 13 from dropping out of place. When the hook 12 is not in use it is folded into the body of the handle through the slot or opening 16 as shown in Fig. 1, when the scoop can be used for ordinary purposes.

It will be seen that the scoop is fully balanced, the center of gravity thereof or that of its contents or of the material suspended from the hook 12 always being located immediately below the pivotal point of the scale.

Having described my invention, what I claim is—

1. In a scoop, a suitable weighing scale, a pivoted hook depending from the bottom of the scoop, and means for locking the free end of the hook to the body of the scoop, substantially as set forth.

2. A scoop having a body portion, an upper wall for the same, a suitable handle, a grooved depression in said wall in continuation of the general direction of the handle, a terminal wall for said groove at one end, and an abutting wall at the opposite end located in the path of the handle, a weighing scale pivoted at the terminal wall, and adapted to be folded into said groove and locked against movement against the abutting wall, substantially as set forth.

3. In a scoop, a suitable hook pivoted from the bottom of the scoop, a handle for said scoop, a slot in said handle, said hook being adapted to be folded into said slot, substantially as set forth.

In testimony whereof I affix my signature in the presence of two witnesses.

HENRY G. STIEBEL, JR.

Witnesses:
 H. A. UHL,
 EMIL STAREK.